(12) United States Patent
Baughman et al.

(10) Patent No.: US 9,016,041 B2
(45) Date of Patent: Apr. 28, 2015

(54) VARIABLE-CYCLE GAS TURBINE ENGINE WITH FRONT AND AFT FLADE STAGES

(75) Inventors: John Lewis Baughman, Cincinnati, OH (US); Raymond Eheart, West Chester, OH (US)

(73) Assignee: General Electric Company, Schenectady, NY (US)

( * ) Notice: Subject to any disclaimer, the term of this patent is extended or adjusted under 35 U.S.C. 154(b) by 1027 days.

(21) Appl. No.: 12/956,674

(22) Filed: Nov. 30, 2010

(65) Prior Publication Data

US 2012/0131902 A1    May 31, 2012

(51) Int. Cl.
*F02K 3/065* (2006.01)
*F02K 3/075* (2006.01)
*F02K 3/06* (2006.01)
*F02K 3/062* (2006.01)

(52) U.S. Cl.
CPC . *F02K 3/065* (2013.01); *F02K 3/06* (2013.01); *F02K 3/062* (2013.01); *F02K 3/075* (2013.01)

(58) Field of Classification Search
CPC ......... F02K 3/075; F02K 3/065; F02K 3/072; F02K 3/06; F02K 3/062
USPC ................ 60/226.1, 226.3, 262, 268
See application file for complete search history.

(56) References Cited

U.S. PATENT DOCUMENTS

| 4,766,723 | A  | * | 8/1987  | Newton ............................ 60/797   |
| 5,010,729 | A  | * | 4/1991  | Adamson et al. ............. 60/226.1        |
| 5,079,916 | A  |   | 1/1992  | Johnson                                     |
| 5,404,713 | A  |   | 4/1995  | Johnson                                     |
| 6,763,652 | B2 |   | 7/2004  | Baughman et al.                             |
| 6,763,654 | B2 |   | 7/2004  | Orlando et al.                              |
| 6,948,317 | B2 |   | 9/2005  | Renggli et al.                              |
| 7,134,271 | B2 | * | 11/2006 | Baughman et al. .......... 60/226.1          |
| 7,188,467 | B2 | * | 3/2007  | Johnson ....................... 60/226.1     |
| 7,216,475 | B2 | * | 5/2007  | Johnson ....................... 60/226.1     |
| 7,246,484 | B2 | * | 7/2007  | Giffin et al. ..................... 60/268   |
| 7,475,545 | B2 |   | 1/2009  | Johnson                                     |
| 7,614,210 | B2 |   | 11/2009 | Powell et al.                               |
| 7,758,303 | B1 |   | 7/2010  | Wadia et al.                                |
| 7,770,381 | B2 |   | 8/2010  | Johnson et al.                              |
| 7,784,266 | B2 |   | 8/2010  | Baughman et al.                             |
| 2008/0141676 | A1 | * | 6/2008 | Johnson ........................... 60/785  |
| 2009/0107109 | A1 | * | 4/2009 | Norris et al. ................. 60/226.3    |

* cited by examiner

*Primary Examiner* — William H Rodriguez
*Assistant Examiner* — Alain Chau
(74) *Attorney, Agent, or Firm* — General Electric Company; Pamela A. Kachur

(57) ABSTRACT

A gas turbine engine includes: a front fan having at least one rotor carrying fan blades disposed within a fan duct, and drivingly connected to a low pressure turbine, the front fan including at least one row of outer fan blades disposed outwardly of and connected to the fan blades, the outer fan blades extending across an outer bypass duct which circumscribes the fan duct; a core engine located between the front fan and the low pressure turbine; an aft fan disposed downstream of the low pressure turbine, having at least one rotor carrying aft turbine blades disposed within an aft turbine duct, the aft turbine further including at least one row of aft fan blades disposed outwardly of and connected to the aft turbine blades, and extending across an aft fan duct that surrounds the core engine; and apparatus operable to selectively throttle flow through the outer bypass duct.

18 Claims, 3 Drawing Sheets

VARIABLE-CYCLE GAS TURBINE ENGINE WITH FRONT AND AFT FLADE STAGES

STATEMENT REGARDING FEDERALLY SPONSORED RESEARCH AND DEVELOPMENT

The U.S. Government may have certain rights in this invention pursuant to contract number F33615-03-D-2352 awarded by the Department of the Air Force.

BACKGROUND OF THE INVENTION

This invention relates generally to gas turbine engines and more particularly to and adaptive cycle gas turbine engine including an aft fan.

A gas turbine engine includes a turbomachinery core that is operable in a known manner to generate a primary flow of propulsive gas. A typical turbofan engine adds a low pressure spool with a turbine driven by the core exhaust gases that in turn drives a fan through a shaft to generate a bypass flow of propulsive gas. A turbofan engine may be characterized as "low bypass" or "high bypass" based on the ratio of bypass flow to core flow.

Low-bypass turbofan engines are commonly used in military aircraft. Increasingly, emphasis is being applied to low-observable and integrated powerplant technology. These considerations drive the use of embedded installations in which an engine is "buried" deep within an airframe (as opposed to being mounted in a pod or nacelle) and may have indirect and long inlet and exhaust ducts.

Advanced military aircraft concepts will require improved performance moderate- to high-bypass turbine engines in embedded installations. Performance requirements are demanding engine cycles with increasingly higher overall pressure ratios, but with low pressure ratio fans. Prior art engine architectures require a large number of stages in the low pressure spool in order to achieve a high overall pressure ratio while maintaining relatively low rotational speeds required by the fan. Fans in such engines are large diameter and therefore create difficulties in the sharp turns required in the embedded inlet due to the short distance from the front of the vehicle to the fan face. Other vehicle requirements such as large air offtakes for high lift devices, large mechanical and/or electrical power extraction for aircraft mission systems and high thermal loads are difficult to meet with a fixed cycle turbine engine.

Accordingly, there is a need for an adaptive cycle, high performance turbine engine suitable for use in embedded installations.

BRIEF SUMMARY OF THE INVENTION

These and other shortcomings of the prior art are addressed by the present invention, which provides a variable-cycle engine having a front fan with a FLADE stage and an aft fan.

According to one aspect of the invention, a gas turbine engine includes: a front fan having at least one rotor carrying fan blades disposed within a fan duct, and drivingly connected to a low pressure turbine, the front fan including at least one row of outer fan blades disposed outwardly of and connected to the fan blades, the outer fan blades extending across an outer bypass duct which circumscribes the fan duct; a core engine located between the front fan and the low pressure turbine; an aft fan disposed downstream of the low pressure turbine, having at least one rotor carrying aft turbine blades disposed within an aft turbine duct, the aft turbine further including at least one row of aft fan blades disposed outwardly of and connected to the aft turbine blades, and extending across an aft fan duct that surrounds the core engine; and apparatus operable to selectively throttle flow through the outer bypass duct.

BRIEF DESCRIPTION OF THE DRAWINGS

The invention may be best understood by reference to the following description taken in conjunction with the accompanying drawing figures in which.

DETAILED DESCRIPTION OF THE INVENTION

Figure 1:
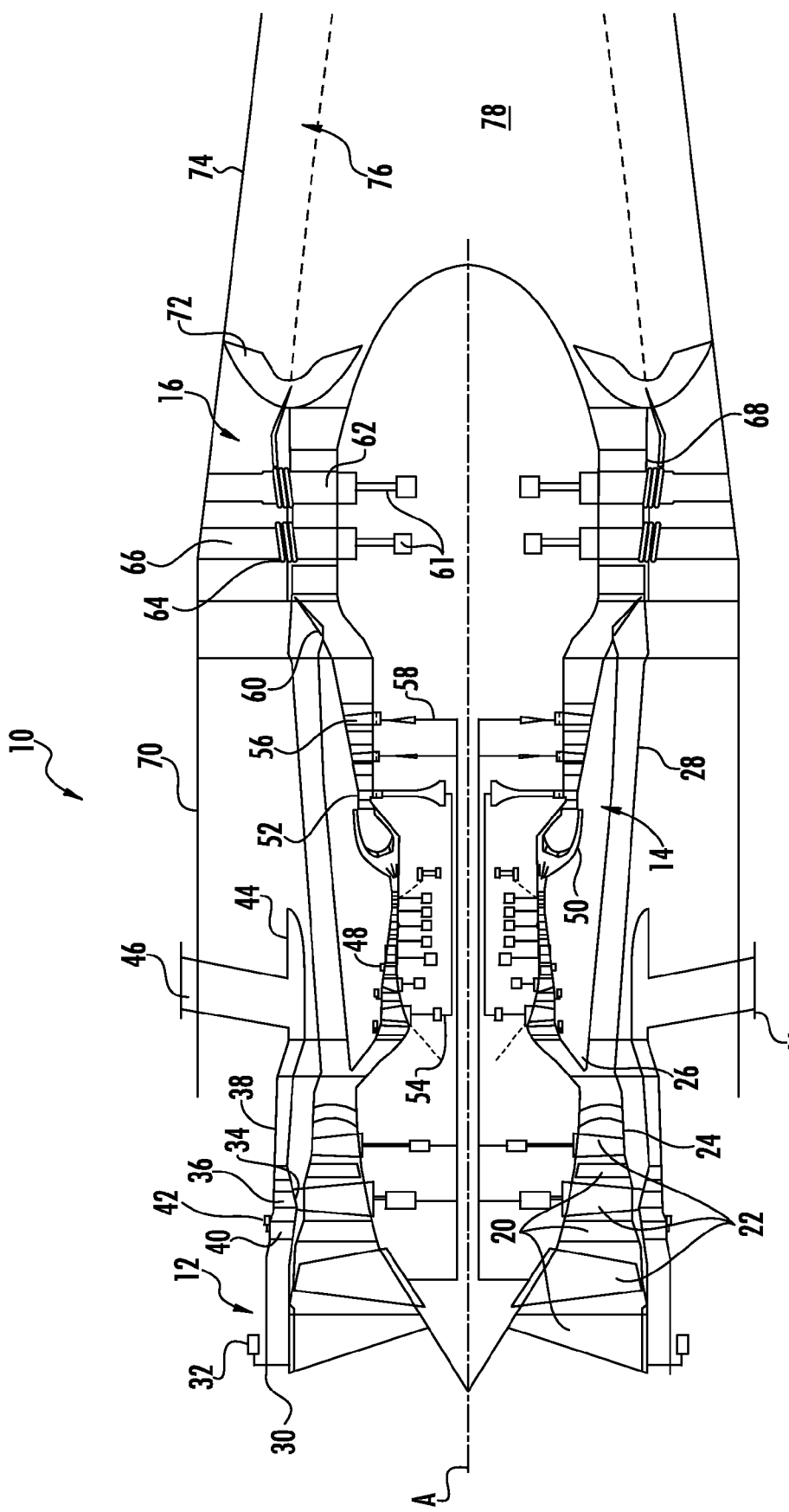
FIG. 1 is a schematic cross-sectional view of a gas turbine engine constructed according to an aspect of the present invention.

Referring to the drawings wherein identical reference numerals denote the same elements throughout the various views, FIG. 1 illustrates an aft fan adaptive cycle gas turbine engine constructed in accordance with an aspect of the present invention, generally designated 10. The engine 10 has a longitudinal center line or axis A. Its major components, in sequential flow order, are a front fan 12, a core engine 14 (also referred to as a gas generator), and an aft fan 16.

The front fan 12 rotates in a single direction and includes three fan stages, each having an annular array of stationary, airfoil-shaped guide vanes 20 and a downstream array of rotating, airfoil-shaped fan blades 22. A fan duct 24 surrounds the fan stages and terminates at an annular splitter 26 that communicates with the core engine 14 and with an inner bypass duct 28 that circumscribes the core engine 14. The flow capacity of the front fan 12 relative to the flow capacity of the core engine 14 determines the corresponding mass flow ratio at the splitter 26, commonly referred to as the "bypass ratio". The illustrated engine 10 has a low-to-moderate bypass ratio, for example about 0.3 to about 1. The guide vanes 20 of the first front fan stage are positioned at a fan inlet 30 (these are commonly referred to as "inlet guide vanes"). Their angle of incidence may be varied to throttle flow through the front fan 12, for example using actuators 32 of a known type (shown schematically).

The front fan 12 is sized (e.g. through selection of airfoil sections and dimensions, duct dimensions, and intended rotational speed) to operate at a moderate pressure ratio (i.e. the ratio of fan discharge pressure to fan inlet pressure). As used herein, the term "moderate" refers to a ratio of about 2 to about 5.

The front fan 12 incorporates a "FLADE" stage (FLADE being an acronym for "fan on blade"). Each blade of the FLADE stage includes an arcuate platform segment 34 disposed at the tip of one of the fan blades 22, and an outer fan blade 36 extending from the platform segment 34. The outer fan blades 36 are disposed within an outer bypass duct 38 that circumscribes the fan duct 24.

An array of stationary, airfoil-shaped outer guide vanes 40 are positioned in the outer bypass duct upstream of the outer fan blades 36. Their angle of incidence may be varied to throttle flow through the outer bypass duct 38, for example using actuators 42 of a known type (shown schematically). The actuators 42 (and other actuators described herein) may be operated under the control of a FADEC, PMC, manual control, or other known type of engine control (not shown).

The outer bypass duct 38 terminates in an annular manifold 44 that in turn connects to one or more offtake ducts 46. The offtake ducts 46 may be used to supply flow from the outer fan blades 36 (referred to herein as "FLADE flow") to an aircraft system (not shown) such as a powered high-lift system, a cooling system, thrust vectoring nozzles, etc.

The core engine 14 includes, in sequential flow order, a compressor 48, a combustor 50, and a high-pressure turbine 52. The high-pressure turbine 52 drives the compressor 48 through an outer shaft 54. A low-pressure turbine 56 is disposed downstream of the high-pressure turbine 52 and drives the front fan 12 through an inner shaft 58. A forward mixer 60 is disposed aft of the low-pressure turbine 56 and communicates with both the inner bypass duct 28 and the exit of the core engine 14.

The aft fan 16 is positioned downstream of the mixer 60. It includes two fan stages, each having a rotor 61 carrying an annular array of compound blades. Each of the compound blades includes an aft turbine blade 62, an arcuate platform segment 64, and an aft fan blade 66. The aft turbine blades 62 lie within an aft turbine duct 68 that receives the mixed flow from the front fan 12 and the core engine 14. The aft fan blades 66 lie within an aft fan duct 70 that surrounds the core engine 14 and the inner bypass duct 28. The camber of the aft turbine blades 62 and aft fan blades 66 of the two stages are opposite to each other, such that in operation the two stages rotate in opposite directions (counter-rotation).

In operation, air is pressurized in the compressor 48 and subsequently mixed with fuel and burned in the combustor 50 to generate combustion gases. The high pressure turbine 52 extracts energy from the combustion gases to drive the compressor 48. The low pressure turbine 56 extracts energy from the mixture of the combustion gases and the inner bypass flow to drive the front fan 12. The aft turbine blades 62 extract energy from the combustion gases to drive the aft fan 16, which generates propulsive thrust. In the illustrated example, an aft mixer 72 is positioned downstream of the aft fan 16, and the flow streams from the aft turbine blades 62, and the aft fan 16 mix therein and are discharged into a common exhaust duct 74. Alternatively, the aft mixer 72 could be eliminated, and the flow stream from the aft fan 16 may be discharged through a separate duct 76 (indicated schematically by the dashed lines in FIG. 1) while the flow stream from the aft turbine blades 62 is discharged through an inner duct 78.

During operation, the outer fan blades 36 provide a constant-pressure FLADE flow to the manifold 44 and offtake ducts 46. The FLADE flow may be throttled as necessary by the variable-position outer guide vanes 40. The flow of the front fan 12 may be throttled as necessary by the variable position inlet guide vanes 20. By proper selection of the outer guide vane 40 position and the inner guide vane 20 position, constant (or nearly constant) flow and pressure of the FLADE stream can be maintained over a thrust range from maximum to under 40% of maximum (e.g. at typical approach-to-landing conditions).

Figure 2:
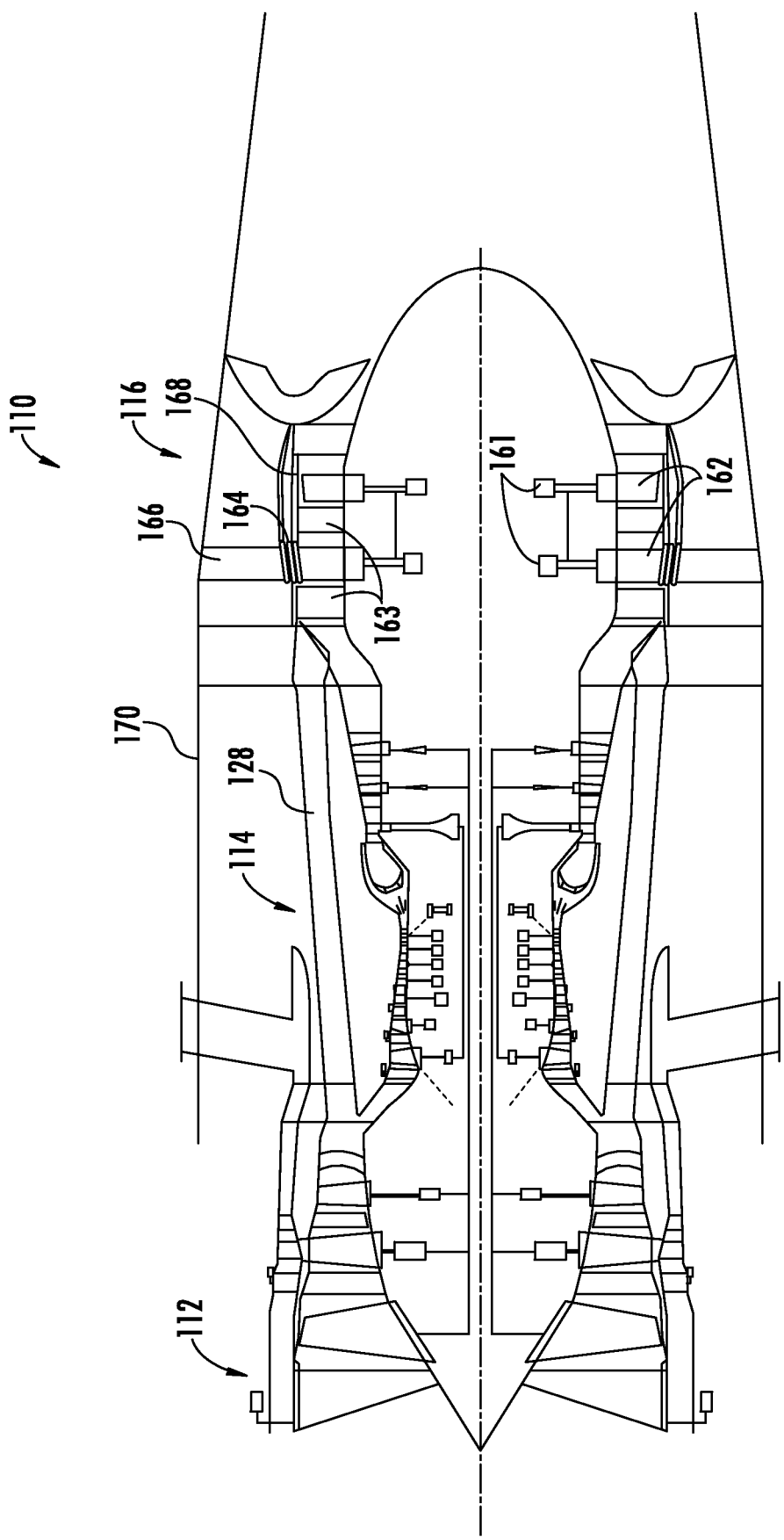
FIG. 2 is a schematic cross-sectional view of alternative gas turbine engine constructed according to an aspect of the present invention.

FIG. 2 illustrates an alternative aft fan adaptive cycle engine 110 constructed according to another aspect of the invention. It is similar in overall construction to the engine 10 described above and includes a front fan 112, a core engine or gas generator 114, and an aft fan 116. The engine 110 differs from the engine 10 in the configuration of the aft fan 116.

The aft fan 116 includes one or more rotors 161, all rotating in a single direction and coupled together to form an aft spool. Each rotor 161 carries an annular array of aft turbine blades 162. An annular array of airfoil-shaped stationary aft turbine vanes 163 is disposed upstream of each rotor 161. One of the rotors 161 carries compound blades having an aft turbine blade 162, an arcuate platform segment 164 disposed at the tip of the aft turbine blade 162, and an aft fan blade 166 extending outward therefrom. The aft turbine blades 162 lie within an aft turbine duct 168 that receives the mixed flow from the front fan 112 and the core engine 114. The aft fan blades 166 lie within an aft fan duct 170 that surrounds the core engine 114 and the inner bypass duct 128. The flow energy absorbed by the aft turbine blades 162 is transferred through the rotors 161 to the single row of aft fan blades 166. Operation of the engine 110 is substantially the same as the engine 10 described above, the primary difference being a lower pressure ratio in the single-stage aft fan 116 as compared to the two-stage aft fan 16. If desired, the aft fan 116 may be provided with a second fan stage by providing another aft spool (with rotors 161, aft turbine blades 162, aft turbine blades 163, and aft fan blades 166 as described above) positioned aft of the aft fan spool as shown in FIG. 2. The two aft fan spools may be co-rotating or counter-rotating relative to each other. If the spools are co-rotating, an annular array of airfoil-shaped vanes would be provided in the aft fan duct 170 between the rows of aft fan blades 166, to redirect the flow exiting the upstream spool into the downstream spool.

Figure 3:
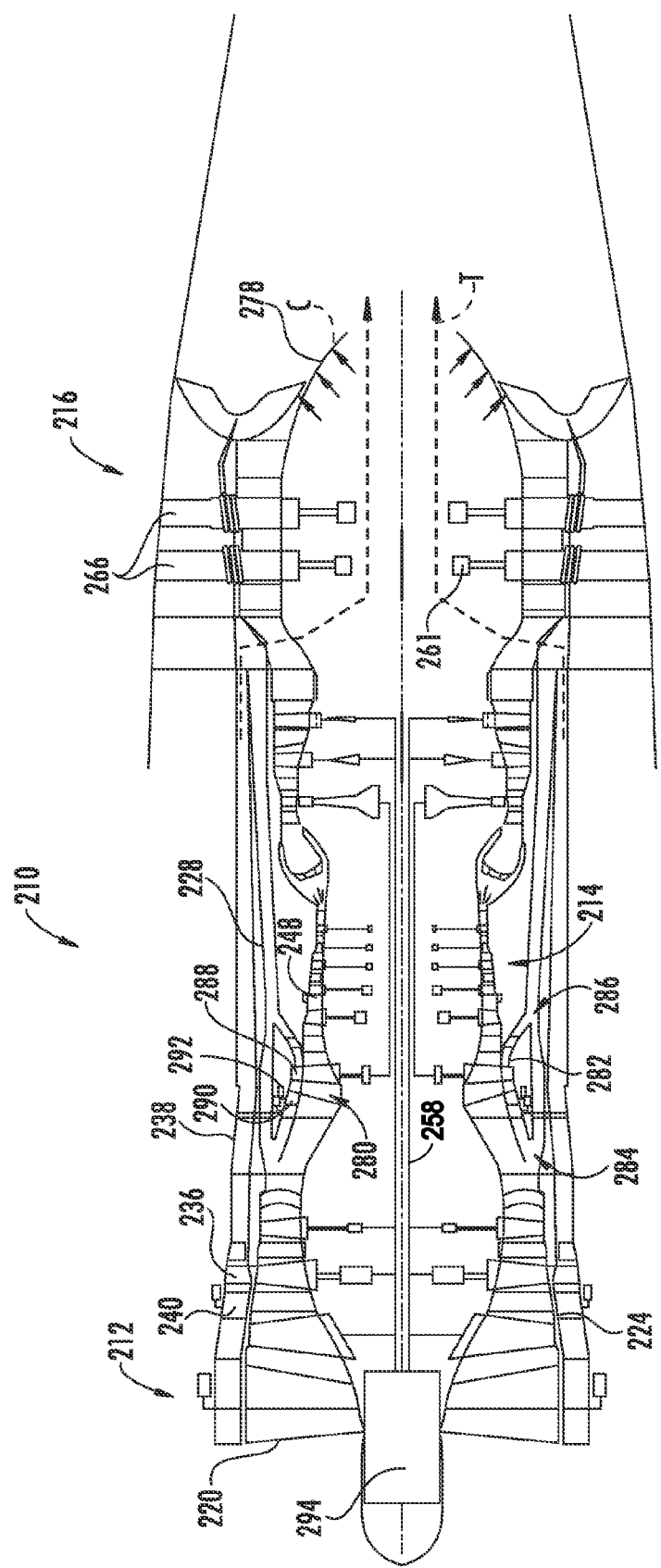
FIG. 3 is a schematic cross-sectional view of another alternative gas turbine engine constructed according to an aspect of the present invention.

FIG. 3 illustrates yet another alternative aft fan adaptive cycle engine 210 constructed according to another aspect of the invention. Like the engines 10 and 110 described above, its major components, in sequential flow order, are a front fan 212, a core engine 214, and an aft fan 216.

The front fan 212 operates as the front fan 12 described above and includes variable inlet guide vanes 220, and a FLADE stage including outer fan blades 236 and variable-incidence outer guide vanes 240.

The outer fan blades 236 are disposed within an outer bypass duct 238 that circumscribes the fan duct 224. In this configuration, the outer bypass duct 238 extends the full length of the core engine 214 and communicates with the interior of a streamlined centerbody 278 that encloses the rotors 261 of the aft fan 216. FLADE flow produced by the outer fan blades 236 may be used to provide cooling of the centerbody 278 by being discharged through cooling holes (shown by the arrows marked "C") and/or additional thrust, if directed axially aft (shown by the arrows marked "T").

As shown, the aft fan 216 is counter-rotating and includes two rows of aft fan blades 266. A single-stage configuration similar to that shown in FIG. 2 is possible as well.

The engine 210 incorporates a core drive fan stage ("CDFS") illustrated generally at 280. This includes a duct 282 at the axially upstream end of the compressor 248, having an inlet 284 and an outlet 286 which both communicate with the inner bypass duct 228. Core drive fan blades 288 extend from the tips of compressor blades of a stage of the compressor 248 and are positioned within the duct 282. An array of stationary, airfoil-shaped guide vanes 290 are positioned in the duct 282 upstream of the core drive fan blades 288. Their angle of incidence may be varied to throttle flow through the duct 282, for example using actuators 292 (shown schematically). When the guide vanes 290 are open, the CDFS is effective to increase the pressure of the flow in the inner bypass duct 228 and thus the overall effective fan pressure ratio of the engine 210.

The engine 210 may also include a generator 294 configured for significant electrical power extraction. The illustrated generator 294 is coupled to the inner shaft 258, but it could also be driven through an accessory gearbox (not shown). The FLADE flow may be modulated to manage the power extracted from the low-pressure spool, for example by closing down the outer guide vanes 240 as the electrical load increases.

The engine configurations described above all provide a FLADE air stream which may be used in various ways to meet particular vehicle system requirements, while still maintaining a desired flow rate, bypass ratio, and mass flow rate from the aft fan.

Initial cycle studies have shown the potential to maintain a constant flow and pressure to the vehicle from a FLADE stream over a thrust range from maximum to under 40% of maximum at typical approach conditions. Overall gas generator pressure ratios of 60 or higher are achievable with a well balanced split of pressure ratio between the front fan and the high pressure compressor.

The foregoing has described an adaptive cycle, aft fan gas turbine engine. While specific embodiments of the present invention have been described, it will be apparent to those skilled in the art that various modifications thereto can be made without departing from the spirit and scope of the invention. Accordingly, the foregoing description of the preferred embodiment of the invention and the best mode for practicing the invention are provided for the purpose of illustration only and not for the purpose of limitation, the invention being defined by the claims.

What is claimed is:

1. A gas turbine engine, comprising:
   a front fan having at least one stage, each stage comprising a rotor carrying an annular array of fan blades disposed within a fan duct, the front fan drivingly connected to a low pressure turbine, the front fan further including at least one row of outer fan blades disposed radially outwardly of and connected to the fan blades, the row of outer fan blades radially extending across an outer bypass duct which circumscribes the fan duct;
   a core engine operable to produce a stream of pressurized combustion gases, the core engine axially located between the front fan and the low pressure turbine, wherein the fan blades of the front fan extend across an inner bypass duct that surrounds the core engine, and;
   an aft fan disposed downstream of the low pressure turbine, having at least one stage, each stage comprising a rotor carrying an annular array of aft turbine blades disposed within an aft turbine duct, the aft turbine further including at least one row of aft fan blades disposed radially outwardly of and connected to the aft turbine blades, and extending radially across an aft fan duct that surrounds the core engine and the inner bypass duct, wherein airflow of the aft fan duct and airflow of the outer bypass duct are completely physically separated from each other at all points upstream of an exit of the aft fan; and
   apparatus operable to selectively throttle flow through the outer bypass duct.

2. The engine of claim 1 wherein an array of variable-incidence-angle outer guide vanes are positioned in the outer bypass duct upstream of the outer fan blades.

3. The engine of claim 1 wherein the aft fan comprises a plurality of stages of aft turbine blades driving a spool which in turn drive a single row of aft fan blades.

4. The engine of claim 1 wherein the aft fan comprises two rows of aft turbine blades carrying corresponding rows of aft fan blades, the blade rows configured to rotate in opposite directions.

5. The engine of claim 1 wherein the aft fan comprises two spools, each spool comprising one or more rows of aft turbine blades and one row of aft fan blades, the two spools configured to rotate in opposite directions.

6. The engine of claim 1 wherein the aft fan comprises:
   two spools, each spool comprising one or more rows of aft turbine blades and one row of aft fan blades; and
   a row of stator vanes positioned between the rows of aft fan blades;
   wherein the two spools are configured to rotate in the same direction.

7. The engine of claim 1 wherein variable-angle inlet guide vanes are disposed in the outer bypass duct upstream of the front fan blades.

8. The engine of claim 1 wherein the outer bypass duct is in flow communication with an annular manifold which in turn communicates with at least one offtake duct.

9. The engine of claim 1 wherein the outer bypass duct is in flow communication with the interior of a streamlined centerbody positioned downstream of the aft fan.

10. The engine of claim 9 wherein the centerbody includes a plurality of openings configured to discharge cooling air.

11. The engine of claim 9 wherein the centerbody includes an aft-facing nozzle.

12. The engine of claim 1 wherein flow exiting the aft fan is segregated from flow exiting the core engine.

13. The engine of claim 1 wherein flow exiting the aft fan is mixed with flow exiting the core engine.

14. The engine of claim 1 wherein the core engine includes, in sequential flow order: a compressor, a combustor, and a high-pressure turbine.

15. The engine of claim 1 further comprising an electrical generator drivingly connected to the front fan.

16. The engine of claim 1 further including a core drive fan stage including a row of core drive fan blades extending from and driven by compressor blades of the core engine.

17. The engine of claim 16 wherein the core drive fan blades are located in a duct which communicates with an inner bypass duct that circumscribes the core engine and communicates with the fan duct.

18. The engine of claim 17 wherein variable-angle guide vanes are disposed in the duct upstream of the core drive fan blades.

* * * * *